(12) United States Patent
Russ et al.

(10) Patent No.: US 8,449,201 B2
(45) Date of Patent: May 28, 2013

(54) ELEMENT FOR SEALING TWO PARTS THAT CAN BE ROTATED IN RELATION TO ONE ANOTHER

(75) Inventors: Erich Russ, Gremsdorf (DE); Hubertus Frank, Höchstadt (DE); Hermann Willaczek, Hemhofen (DE)

(73) Assignee: IMO Holding GmbH, Gremsdorf (DE)

( * ) Notice: Subject to any disclaimer, the term of this patent is extended or adjusted under 35 U.S.C. 154(b) by 841 days.

(21) Appl. No.: 11/991,348

(22) PCT Filed: Aug. 25, 2006

(86) PCT No.: PCT/EP2006/008373
§ 371 (c)(1),
(2), (4) Date: Aug. 27, 2009

(87) PCT Pub. No.: WO2007/025683
PCT Pub. Date: Mar. 8, 2007

(65) Prior Publication Data
US 2009/0324153 A1  Dec. 31, 2009

(30) Foreign Application Priority Data
Sep. 1, 2005  (DE) .................. 10 2005 041 720

(51) Int. Cl.
*F16C 33/76*  (2006.01)
(52) U.S. Cl.
USPC ........... 384/607; 384/486; 277/353; 277/407; 277/562
(58) Field of Classification Search
USPC .................. 384/484, 485, 486, 607; 277/353, 277/404–407, 425, 433, 562, 569
See application file for complete search history.

(56) References Cited

U.S. PATENT DOCUMENTS

| | | | |
|---|---|---|---|
| 3,011,814 A | 12/1961 | Rhoads et al. | |
| 3,652,141 A | 3/1972 | Husten et al. | |
| 3,814,488 A * | 6/1974 | Rood | 384/613 |
| 4,067,155 A * | 1/1978 | Ruff et al. | 52/105 |
| 4,283,063 A | 8/1981 | Prescott | |
| 4,544,286 A * | 10/1985 | Basener | 384/486 |
| 4,605,318 A * | 8/1986 | Kaiser | 384/482 |
| 4,789,254 A * | 12/1988 | Marquardt et al. | 384/611 |
| 4,798,481 A * | 1/1989 | Frank | 384/477 |
| 4,921,260 A | 5/1990 | Takenaka et al. | |
| 5,074,677 A * | 12/1991 | Andree et al. | 384/448 |
| 5,683,186 A * | 11/1997 | Akimoto | 384/607 |
| 6,217,031 B1* | 4/2001 | Catalano et al. | 277/549 |
| 2006/0182634 A1* | 8/2006 | Kirsch et al. | 416/244 A |

FOREIGN PATENT DOCUMENTS

| | | | |
|---|---|---|---|
| DE | 102004052598 | * | 10/2004 |
| JP | 06026077 | | 2/1994 |

* cited by examiner

*Primary Examiner* — Michael P Ferguson
*Assistant Examiner* — Nahid Amiri
(74) *Attorney, Agent, or Firm* — Pandiscio & Pandiscio

(57) ABSTRACT

The invention relates to an element (10) for sealing two parts (2, 3) that can be rotated in relation to one another. Said element comprises at least one first sealing ring (11) consisting of a permanently elastic material, which is fixed to one of the two rotatable parts and comprises at least one sealing lip (21) and at least one second sealing ring (12), which is fixed to the other rotatable part and comprises a strip (19) consisting of another material that runs along its periphery. At least one sealing lip of the first sealing ring lies against said strip.

30 Claims, 3 Drawing Sheets

ELEMENT FOR SEALING TWO PARTS THAT CAN BE ROTATED IN RELATION TO ONE ANOTHER

BACKGROUND OF THE INVENTION

1. Field of the Invention

This invention relates to an element for sealing two parts that can be rotated in relation to one another, with at least one sealing ring consisting of a permanently elastic material that is fixed to one of the two parts that can be rotated in relation to one another, and at least one sealing lip.

2. Description of the Prior Art

Commercial seals generally comprise a ring consisting of an elastic material fastened to one of the two parts that can be rotated in relation to one another, and that is provided with a sealing lip that is tightly pressed against a surface of the other of the two parts that can be rotated in relation to one another. For the sealing lip not to wear out prematurely, the contact surface should be as smooth as possible. A machined and/or polished surface area of the relevant rotating part is ordinarily used for this, which may also be protected against corrosion by a grease film. However, this arrangement has drawbacks:

In large bearings, in particular in plant construction, for example in the case of a pitch bearing of a wind energy system, but also in much medical equipment, the relevant rotating part is often so large that it is uneconomical to use stainless steel for this. The use of ordinary steel that rusts, on the other hand, leads to relatively rapid corrosion from the weathering of exposed bearings, since a protective grease film is quickly washed away by rain. Especially in coastal regions (wind energy systems) or even on the high seas (ships), the air is also very corrosive because of the salt water. However, as soon as corrosion sets in, the seal is damaged by the roughened surface it causes, and is finally destroyed.

In other uses, and in the medical technology sector, no grease film, or emergence of grease, is permissible, so that here also there is no corrosion protection, and without using a variety of stainless steel that substantially increases the cost of the equipment in question, corrosion would be unavoidable.

Many bearings can also be serviced only at great expense, so that it would be desirable for such applications to have available a special sealing element that does not have to be serviced, even in systems with a life expectation of 20 years.

The above considerations result in the problem behind the invention, of providing a seal that operates without wear even under rough or even corrosive environmental conditions, and/or without a protective grease film, for as long a time as possible.

SUMMARY OF THE INVENTION

This problem is solved with a seal of this type by at least one second sealing ring that is fixed to the other of the parts that can be rotated in relation to one another, and that carries a strip made of another material that contacts the at least one sealing lip of the first sealing ring and that runs along its periphery.

The second sealing ring serves only as the carrier for the strip that serves as the contact surface for the opposite sealing lip, and can therefore be matched optimally to this task with regard to the choice of its material. For example, it can have higher elasticity than the sealing strip to compensate for tolerances of the components. The assembly and fastening of the sealing strip are considerably facilitated, which is important also with regard to a continuous strip surface. The sealing strip can also be relatively thin, for example 0.5 to 2 mm thick, and because of its small weight, a high-value, low-wear material can be used for it.

It has proved to be desirable for the material of the second sealing ring to have a higher specific electrical resistance $\rho$ than the material of the strip it carries. The second sealing ring is preferably made of an electrically insulating material, for example, of a material with a specific electrical resistance $\rho$ of more than $10^3$ $\Omega$m, particularly of more than $10^6$ $\Omega$m. Therefore, it sees to it that the strip pursuant to the invention, together with the relevant rotating part, does not constitute a local chemical voltaic cell.

Special benefits are obtained by manufacturing the first and second sealing rings from the same material. The invention prefers for this a vulcanized, i.e. crosslinked, material, for example vulcanized rubber, because this is not only elastic but is permanently elastic as a consequence of the molecules crosslinked with one another, in contrast to uncrosslinked rubber. Therefore, the result is that the post-vulcanization that gradually reduces the elasticity existing initially in uncrosslinked rubber is largely or even completely eliminated.

Other benefits are available by manufacturing the strip of metal, especially a noble metal or a refined metal, for example, stainless steel. Because of its relatively great hardness, metal is relatively wear resistant. The development of material-destroying local voltaic cells can be avoided by the insulated fastening to the second sealing ring as the carrier. Finally, noble or refined metal is not subject to corrosion.

It is a great advantage for the material of the strip to have a lower coefficient of friction $\mu$ than the second sealing ring. This spares the sealing lip even with no grease film, which likewise has a beneficial effect on the achievable service life. The capability of reducing the coefficient of friction $\mu$ exists if the surface area of the strip serving as the contact surface for a sealing lip of the first sealing ring is smoothed or polished.

The sliding of the sealing lip along the strip pursuant to the invention with as little friction as possible is also supported if the surface area of the strip serving as the contact surface for a sealing lip of the first sealing ring follows somewhat a surface of rotation, especially a cylindrical envelope surface. This distributes the pressure of the sealing lip uniformly on the entire circumference, and there are no points with elevated wear.

Inasmuch as the strip is closed in a ring, on the one hand, it in turn is given the rotational symmetry necessary to minimize wear of the sealing lip running along it, and on the other hand an annular structure is advantageous for fastening the strip to the second sealing ring. An annular structure, i.e. a structure that is doubly coherent, can be achieved by welding or cementing the two end faces of the strip, preferably abutting blunt ends, optionally followed by smoothing or polishing the joint, particularly the weld bead or cement point. The strip ends can be joined before or after assembly with the relevant sealing ring, as needed; however, the invention prefers to join the strip ends before assembly with the relevant sealing ring, or before installing the seal.

A constant cross section of the strip along its entire periphery serves the same purpose, namely, optimal rotational symmetry. The invention prefers a somewhat rectangular cross section with the sealing lip finding an optimal contact surface on one of the wider circumferential surfaces of such a strip, while the thickness perpendicular to this surface can be as small as possible to impart flexibility to the strip.

With a view to automatic fastening of the strip, it is recommended to fasten it, using the second sealing ring, to a preferably somewhat cylindrical envelope surface of the relevant rotating part, where fastening is achieved solely because of geometric characteristics, so that the use of adhesive is unnecessary.

Especially suitable for this is a convex domed outer envelope surface of the relevant rotating part around which the strip pursuant to the invention can be wrapped like a belt and can thereby have an optimal grip.

Since the tiniest points of contact between a metallic strip pursuant to the invention and a likewise metallic rotating part can lead to a local voltaic cell, the encircling strip should be fixed on the second sealing ring in such a way that no contact at all exists with either of the two parts that can be rotated in relation to one another.

To avoid migration of the strip, it can be held in an encircling trough-like recess in the second sealing ring.

If the depth of the trough in the second sealing ring that holds the strip is less than the corresponding cross-sectional height, i.e. the thickness, of the strip laid in it, then the surface area of the ring serving as the actual contact surface for the sealing lip of the other rotating part rises above the delimiting surface areas of the second sealing ring. Even if there is a small clearance between the parts that can be rotated in relation to one another, permanent contact between the sealing lip on the first sealing ring and the second sealing ring is precluded, and so is damage to these parts caused by friction.

Pressure forces exerted by the sealing lip on the strip pursuant to the invention—perhaps together with fastening forces produced by the annular strip itself—act on the bottom surface of a trough in the second sealing ring holding the strip. To be able to be passed on from there to the relevant rotating part, the bottom of the trough in the second sealing ring holding the encircling strip runs generally parallel to the surface area of the rotatable part to which the second sealing ring is fastened.

The strip pursuant to the invention is carried in the trough of the second sealing ring; because of its guidance task, the second sealing ring needs orientation or anchoring relative to the actual rotatable part. This is achieved by a stud or the like, which is formed on a peripheral area of the cross section of the second sealing ring opposite the trough and is laid in a somewhat complementary groove-like recess in the relevant surface area of the rotatable part.

The fastening stud of the second sealing ring can be provided with projections that stand out cross-sectionally on its radially inner and/or outer surface, which increase its elasticity and permit its complete immersion in a groove-like recess in the rotatable part, on the one hand, and on the other hand guarantee it. These projections can be configured as encircling ribs, or with wavelike or sawtooth-shaped cross sections, or the like.

The second sealing ring can also have a sealing lip that is formed on at least one encircling surface area. If the second sealing ring comprises a vulcanized, i.e. crosslinked (rubber) material, it has permanently elastic characteristics as required by a sealing lip. It is therefore obvious to provide the second sealing ring with a sealing lip also, in order to be able to realize a double or multiple seal at low cost.

Such a sealing lip on the second sealing ring can contact a surface area of the opposite rotatable part. If, as the invention further foresees, the additional sealing lip on the second sealing ring lies within the cavity preferably filled with grease or similar lubricant, that is closed off by the first sealing lip, then corrosion of the surface area of the rotatable part cooperating with the second sealing lip is precluded, so that damage to the second seal is avoided without additional corrosion protection measures.

Alternatively, and/or in addition to the additional sealing lip on the second sealing ring, a surface area that encircles it can be provided as the contact surface for another sealing lip. Such a third seal can lie outside the main seal formed by the strip pursuant to the invention and the first sealing lip contacting it, and then protects the main seal against mechanical influences, for example against impacts.

A particularly simple construction is obtained when the sealing lip contacting a contact surface of the second sealing ring is formed on the first sealing ring.

An arrangement has proved especially beneficial in which the back of the first sealing ring opposite the sealing lip contacting the strip is turned to the outside, or faces the surface of the relevant ring. If it faces the surface of the relevant ring, then it can be supported there as the case may be, so that the sealing lip, even after it is worn, still remains in tight contact with the strip. If it is turned outward, then it can be held in shape easily with a spring element on the front of the area carrying the sealing lip, which can then be retightened, or replaced, at any time because it is accessible from the outside, or can at least be inspected and optionally brought back into shape manually during maintenance. If the back of the sealing lip is covered by another part of the seal, perhaps by another section of the sealing ring itself, then the correct position of the sealing lip can scarcely be inspected during maintenance, not to mention corrected.

The invention is also distinguished by a spring element that presses a sealing lip of the first sealing ring against the strip of the second sealing ring. This can considerably increase the pressure of the sealing lip of the main seal, and with it also its sealing action.

An encircling wire or the like, for example, is suitable as a spring element. It can absorb large tensile forces that result in a far greater radial pressure of the sealing lip than can be brought about by the sealing lip alone. To be able to fulfill its task permanently, even under corrosive environmental conditions, the spring element should be corrosion resistant; for example, it should consists of stainless steel, or the like. This feature can be highly important when the spring element is located outside the sealed-off area.

To avoid problems when assembling the seal, the spring element can have a somewhat circular cross section, so that unintended twisting does not impair its uniform force action.

The spring element is preferably located on the back of the sealing lip of the first sealing element contacting the strip. From there, the pressure preferably acting radially inwardly can act precisely toward the free edge of the sealing lip, so that symmetrical forces are set up in the area of this edge and deformation of the sealing lip is reduced to a minimum.

To hold the spring element permanently in place, it should be laid in an encircling, somewhat trough-shaped recess in the first sealing element. Then it cannot slip, and the pressure action of the sealing lip is supported, even after a very long time of operation. If this trough is located outside the sealed-off area, the spring element is accessible from the outside and can easily be installed after inserting the other sealing elements, and/or can be removed and/or optionally replaced and/or tightened at a later time for maintenance purposes.

For safety reasons, the invention recommends that the trough in the first sealing element has a circular cross section to hold the spring element, preferably along a cross-sectional peripheral angle of more than 180°. In such a case, the spring element cannot be loosened from this trough, even by severe vibrations.

In an arrangement of the spring element in a somewhat common plane with the free edge of the sealing lip, the two edges of the trough holding the spring element lie on both sides of this plane. At least one of the two trough edges in the first sealing element is suitable for fastening the first sealing ring, by lengthening it cross-sectionally away from the first sealing lip. The edge area that projects backward in such a case can be provided with a stud, or the like, at its free end, which is used to anchor the first sealing ring in a somewhat complementary groove-like recess in the relevant surface area of the rotatable part. The groove to hold such a stud does not have to be located on the envelope surface of the relevant rotating part, but can also be recessed in one of its faces.

Like the fastening stud on the second sealing ring, that of the first sealing ring can also have cross-sectionally projecting, preferably wavelike or barb-shaped elevations to increase its elasticity.

The construction pursuant to the invention undergoes further optimization by the tip of the cross section of the sealing lip of the first sealing element contacting the strip lying somewhat on the straight line connecting the centers of the two troughs for holding the strip on the one hand and of the spring element on the other hand. In such a case, the pressure forces are transmitted in a single plane from the spring element over the free edge of the sealing lip to the central area of the strip pursuant to the invention, with no fear of unsymmetrical deformations of the sealing lip and/or of the second sealing ring.

It is within the scope of the invention for the sealing lip of the first sealing element contacting the strip to have a cross section with a blunt tip. Such a blunt-angled tip is only minimally susceptible to unwanted deformations, and can therefore also withstand very high pressure forces over a period of many years and exert them on the strip pursuant to the invention.

Finally, the invention is distinguished by a third sealing ring that is fastened to one of the parts that can be rotated in relation to one another and that has a sealing lip that contacts the other of the parts that can be rotated in relation to one another. This sealing ring also can be provided with a stud, or the like, formed on its cross-sectional area opposite the sealing lip, which is used to anchor it in a somewhat complementary groove-like recess in the relevant surface area of the rotatable part. This fastening stud can also be provided with cross-sectionally projecting elevations, preferably hook-shaped or barb-like elevations.

Other features, characteristics, advantages, and actions based on the invention are given in the following description of a preferred embodiment of the invention, with reference to the drawing.

DESCRIPTION OF THE PREFERRED EMBODIMENTS

Figure 1:
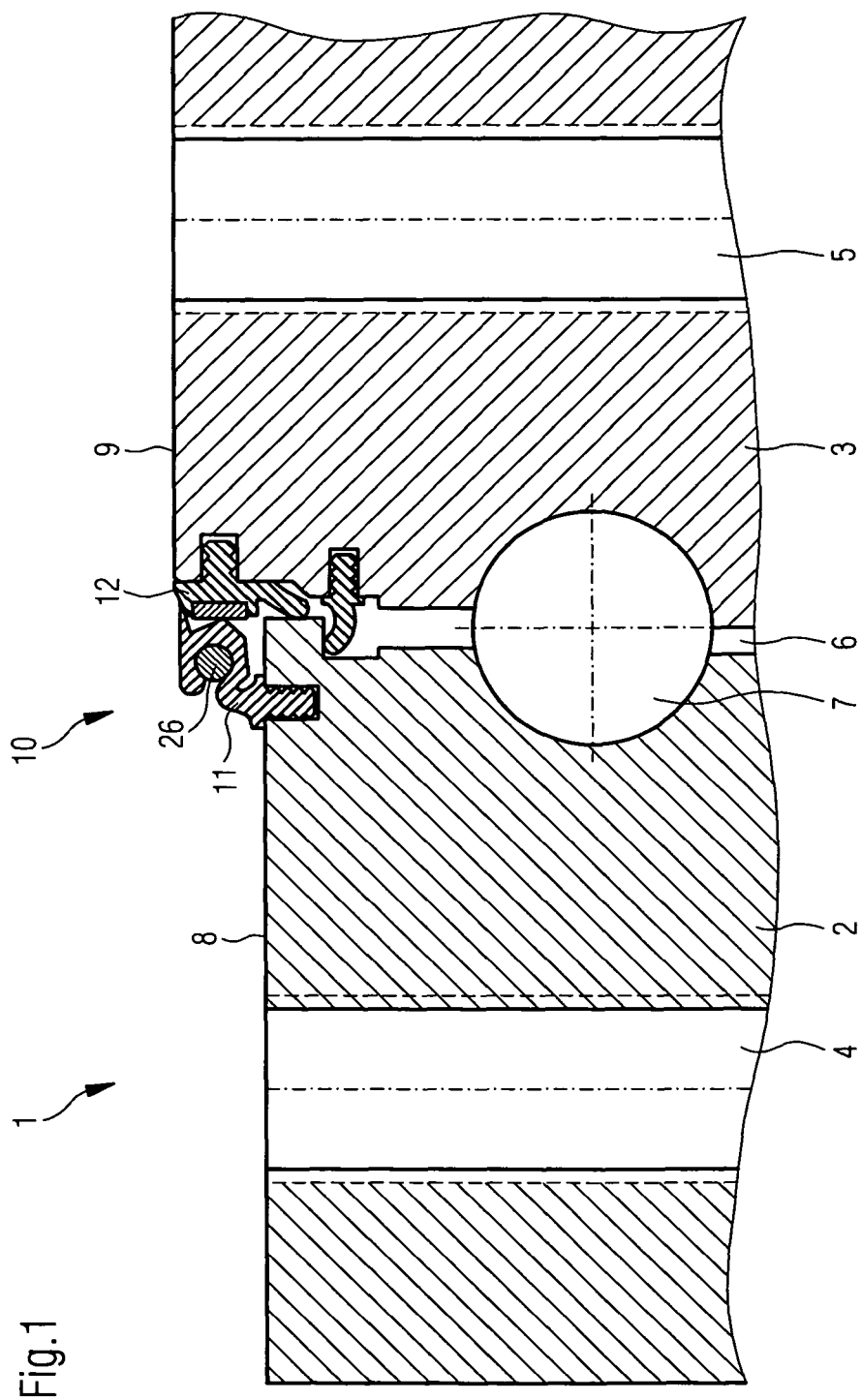
FIG. 1 a section through a ball bearing with a seal pursuant to the invention.

The ball bearing 1 in FIG. 1 comprises two concentric rings that can be rotated in relation to one another. The outer ring 2 is shown on the left in FIG. 1, and the inner ring 3 on the right. Fastening bores 4, 5 parallel to the axis of rotation pass through both rings 2, 3. Raceways for at least one row of ball-shaped rollers 7 are provided in the area of a gap 6 between the two rings 2, 3, which permit the mutual rotation of the two rings 2, 3 as a single degree of freedom of motion. With the ball bearing 1, faces 8, 9, at the top in FIG. 1, are to be exposed to weathering. For this reason, the gap 6 between the two faces 8, 9 is sealed with a seal 10 pursuant to the invention.

Figure 2:
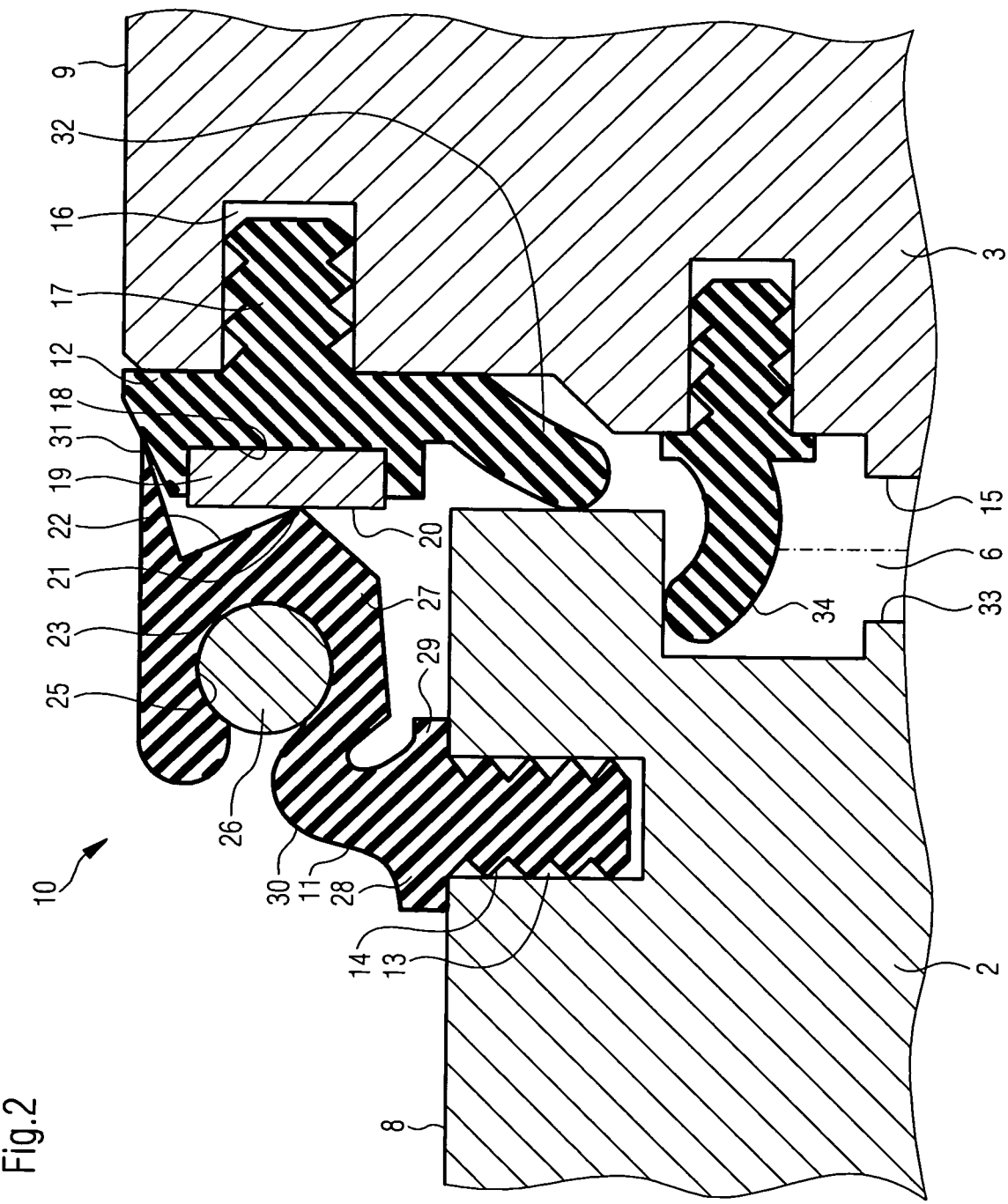
FIG. 2 the seal from FIG. 1 in larger illustration.

As shown in FIG. 2, the seal 10 comprises a first sealing ring 11 and a second sealing ring 12, each made of vulcanized material, for example vulcanized natural or synthetic rubber. The first sealing ring 11 is fastened to the outer ring 2, and the second sealing ring 12 is fastened to the inner ring 3. For this purpose, there is an encircling groove-like recess 13 in the face of the outer ring 2, in which an annular extension 14 of the first sealing ring 11 engages; in the same way, there is a likewise encircling groove-like recess 16 in the envelope face 15 of the inner ring 3 facing the gap 6, which serves to hold the annular extension 17 on the second sealing ring 12.

The second sealing ring 12 fastened in this manner to the inner ring 3 carries an annular, relatively flat trough-like recess 18 on its face opposite the extension 17, for example with a groove-like cross section. The encircling metal strip 19 is laid in this recess, which is wrapped around by the encircling edges of the trough 18 and is thereby prevented from shifting parallel to the axis of rotation of the rotary bearing 1.

There is the sealing lip 21 of the first sealing ring 11 contacting the outside 20 of the metal strip 19, opposite the trough 18. The sealing lip 21 can be formed by an edge with an obtuse open angle, for example, an open angle between 90° and 150°. For this sealing lip 21 to be pressed firmly against the contact surface 20 of the metal strip 19, even when the elasticity of the sealing ring 11 declines, the sealing lip 21 is positioned on the inside 22 of a somewhat sleeve-like section 23 of the outer sealing ring 11. The radially outer envelope surface 24 of this sleeve-like section 23, or the back 24 of the sealing ring 11 opposite the sealing lip 21, is turned outward in the embodiment according to FIGS. 1 and 2, so that the correct position of the sealing lip 21 can be easily inspected for the position of its back 24.

This sleeve-like section 23 at its radially outer envelope surface 24 is also provided with an encircling trough 25 in which the metal spring 26 is laid, which is intended to press the sleeve-like section 23, and with it the sealing lip 21, on it constantly against the metal strip 19. The spring element 26 is preferably a tension spring, optionally with a screw fitting to connect the two ends of the spring. Such an annular closed tension spring can produce maximum tensile stress.

The encircling fastening extension 14 is joined to an edge 27 of the trough 25 closest to the face 8 of the outer ring 2. For this purpose, the edge 27 of the trough 25 is bent toward the face 8. Two lateral shoulders 28, 29 opposite one another are supported on the edges of the groove-like recess 13 in the face 8, while the extension 14 extends completely into this recess 13. Since the bending 30 between the edge 27 of the trough 25 and the extension 14 grips the metal spring 26, in radially outer areas, it can exert a centering action on the metal spring 26 and thus also on the sealing lip 21 of the main seal 19, 21. To lay, tighten, and/or replace the metal spring 26, the trough 25, together with the back 24 of the sealing ring 11, is open toward the outside; the trough 25 is preferably not covered by any other part of the sealing ring 11, so that the metal spring 26 is readily accessible from the outside. To protect against corrosion, the metal spring 26 should be made of a stainless material.

A second sealing lip 31 is provided in the area of the upper face of the sealing ring 11 exposed to the weather, which grips around the metal strip 19 on the outside and on top, and on the other side of it contacts the second, inner sealing ring 12 and is intended to keep pouring rain and other effects, for example impacts, away from the main seal 19, 21.

A sealing lip 32 extending radially outward can also be provided on the second, inner sealing ring 12, inside, i.e. below the trough 18 for the metal strip 19, which is supported on an envelope face 33 of the outer bearing ring 2, facing the gap 6. This internal sealing lip 32, like a third sealing ring 34 that may be provided even further inward, primarily serves to hold back the lubricating grease in the gap 6.

Figure 3:
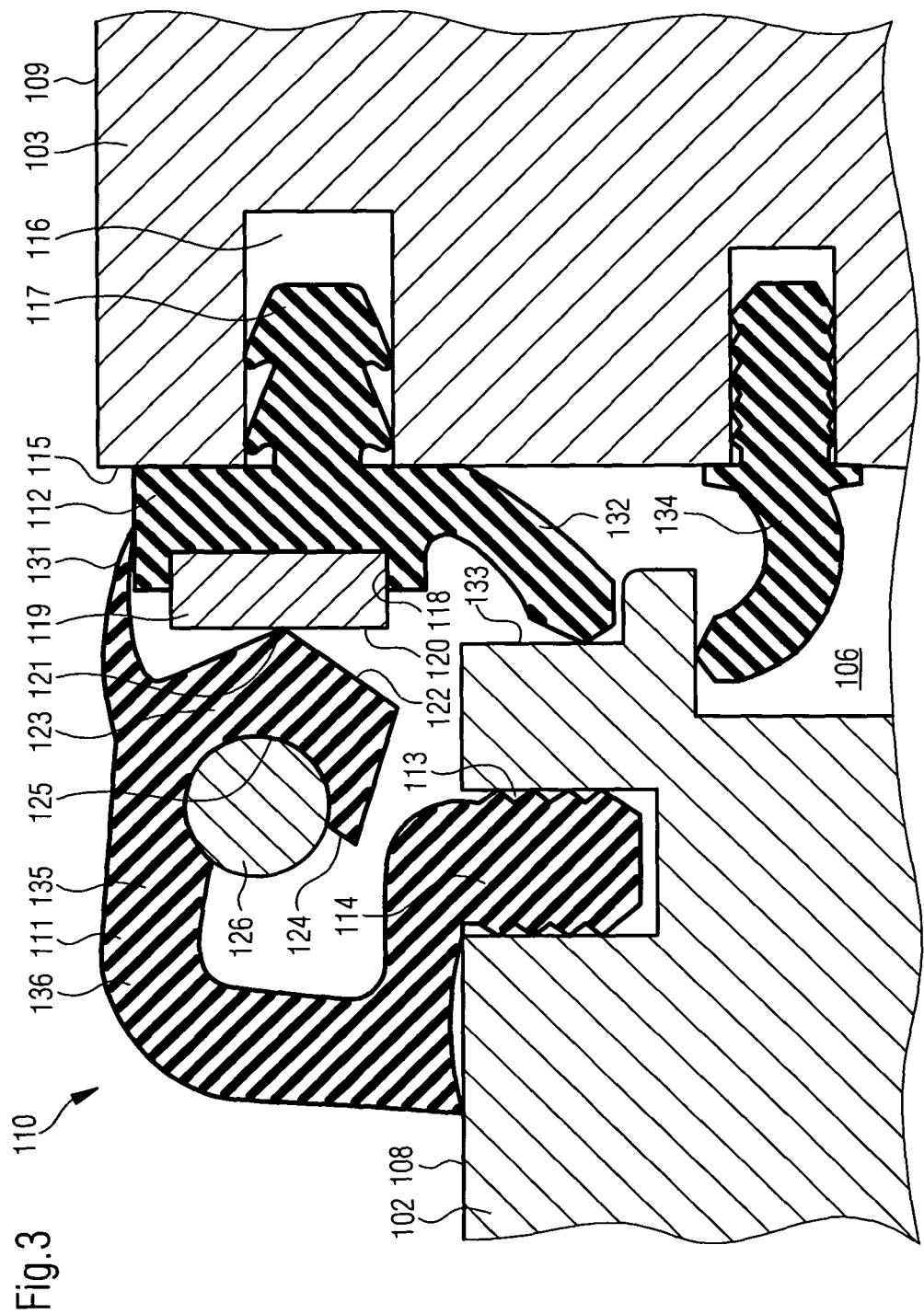
FIG. 3 another embodiment of the invention in an illustration corresponding to FIG. 2.

The embodiment 110 according to FIG. 3 differs from that of FIGS. 1 and 2 only in that in this case the fastening extension 114 of the first sealing ring 111, which engages in an encircling groove-like recess 113 in the face 108 of the outer ring 102, is not connected to the edge 124 of the trough 125 for the metal spring 126 closest to the face 108, but to the trough edge 135 further away from the face 108, likewise by a bend 136. Because of this, the metal spring 126 arrives at the cavity closed off by the main seal 119, 121, and is also removed from external influences; neither is the back 124 of the sealing lip 121 turned outward, nor does it face the face 108 of outer ring 102. In this embodiment, the metal spring 126 is replaced only together with the first sealing ring 111; in the embodiment according to FIGS. 1 and 2, it could also be replaced separately from the first sealing ring 11.

The invention claimed is:

1. A wind energy system comprising at least one pitch bearing having two concentric rings rotatable relative to one another, comprising an inner ring and an outer ring, each of the concentric rings having fastening holes parallel to an axis of rotation, and defining a gap in which raceways for at least one row of rollers are provided, and a seal comprising at least one first sealing ring of a permanently elastic material fixed to the outer ring in an encircling annular recess in an outer axial facing surface of the outer ring, and at least one second sealing ring of a permanently elastic material fixed to the inner ring in an encircling annular recess in an outer radial facing surface of the inner ring, wherein said second sealing ring supports an annular strip in an annular recess, said annular strip comprised of another material, that extends along a peripheral portion of said second sealing ring and abuts a sealing lip of said first sealing ring, wherein an annular spring element is disposed in an encircling recess in an outer radial facing surface of a back portion of the sealing lip of said first sealing ring, and which presses the sealing lip of said first sealing ring toward the strip of said second sealing ring.

2. The wind energy system pursuant to claim 1, wherein the material of said second sealing ring exhibits a higher specific electrical resistance ρ than the strip.

3. The wind energy system pursuant to claim 2, wherein the material of said second sealing ring exhibits a specific electrical resistance ρ of more than $10^3$ Ωm.

4. The wind energy system pursuant to claim 1, wherein the strip is of metal.

5. The wind energy system pursuant to claim 1, wherein the material of the strip exhibits a lower coefficient of friction μ than said second sealing ring.

6. The wind energy system pursuant to claim 1, wherein a surface area of the strip is smooth.

7. The wind energy system pursuant to claim 6, wherein the surface area of the strip extends through a cylindrical envelope surface of rotation.

8. The wind energy system pursuant to claim 1, wherein the annular strip comprises a closed ring.

9. The wind energy system pursuant to claim 8, wherein the strip is provided with a uniform cross section.

10. The wind energy system pursuant to claim 9, wherein the strip is provided with a rectangular cross section.

11. The wind energy system pursuant to claim 8, wherein the annular strip is fixed to said second sealing ring and is spaced from both of the concentric rings.

12. The wind energy system pursuant to claim 1, wherein the depth of the recess in said second sealing ring is less than a corresponding height of the strip held therein.

13. The wind energy system pursuant to claim 1, wherein a bottom of the annular recess in said second sealing ring is generally parallel to a surface area of one of the concentric rings to which said second sealing ring is held.

14. The wind energy system pursuant to claim 13, wherein a stud extends from said second sealing ring in a direction opposite the annular recess of the second sealing ring, to anchor the second sealing ring in the encircling annular recess of the inner ring.

15. The wind energy system pursuant to claim 14, wherein said stud is provided with projections extending outwardly from said stud.

16. The wind energy system pursuant to claim 1, wherein the sealing lip is formed onto a radial front facing surface opposite of the encircling recess of said first sealing ring.

17. The wind energy system pursuant to claim 1, wherein at least one sealing lip of said second sealing ring abuts a surface area of the outer ring.

18. The wind energy system pursuant to claim 1, wherein the sealing lip is integral with said first sealing ring.

19. The wind energy system pursuant to claim 1, wherein a back portion of said first sealing ring opposite the sealing lip extends toward a surface area of the outer ring.

20. The wind energy system pursuant to claim 1, wherein said spring element comprises an encircling wire.

21. The wind energy system pursuant to claim 1, wherein said spring element is provided with a circular cross section.

22. The wind energy system pursuant to claim 3, wherein the encircling recess in said first sealing ring follows a circular cross section along a cross-sectional circumferential angle of more than 180°.

23. The wind energy system pursuant to claim 1, wherein a first of two trough walls in said first sealing ring extend away from the sealing lip.

24. The wind energy system pursuant to claim 23, wherein a stud is formed on the first sealing ring to anchor the first sealing ring in the annular recess in a surface area of the outer ring.

25. The wind energy system pursuant to claim 24, wherein the stud on the first sealing ring is provided with projections extending therefrom.

26. The wind energy system pursuant to claim 1, wherein a tip of the cross section of the sealing lip of said first sealing ring contacting the strip lies on a generally straight line connecting centers of the annular recesses of the inner ring and outer ring.

27. The wind energy system pursuant to claim 1, wherein the sealing lip of said first sealing ring is provided with a cross section with an obtuse-angled tip.

28. The wind energy system pursuant to claim 1, wherein a third sealing ring is fastened to one of the concentric rings, and has a sealing lip that contacts the other of the two concentric rings.

29. The wind energy system pursuant to claim 28, wherein the third sealing ring is provided with a stud extending from the sealing lip, to anchor the third sealing ring in a complementary recess in a surface of the inner ring.

30. The wind energy system pursuant to claim 29, wherein the stud on said third sealing ring is provided with projections extending outwardly therefrom.

* * * * *